United States Patent Office 3,445,367
Patented May 20, 1969

3,445,367
CATALYST AND PROCESS FOR MAKING OLEFIN POLYMERS OF NARROW MOLECULAR WEIGHT DISTRIBUTION
Lyle R. Kallenbach, College Station, Tex., assignor to Phillips Petroleum Company, a corporation of Delaware
No Drawing. Filed Nov. 22, 1965, Ser. No. 509,154
Int. Cl. C08f 1/66; B01j 11/46
U.S. Cl. 260—94.9          10 Claims

ABSTRACT OF THE DISCLOSURE

A catalyst of chromium oxide supported on silica, alumina, zirconia, or thoria is modified by the incorporation of ammonium fluoroborate, heavy metal fluoroborate, or heavy metal fluorosilicate. The catalyst is employed in an improved polymerization process for making olefin polymers having narrow molecular weight distribution.

This invention relates to a catalyst and process for preparing ethylene homopolymers and copolymers of ethylene with other low molecular weight 1-olefins.

The production of normally solid polymers of 1-olefins by polymerization of such olefins in the presence of a catalyst comprising chromium oxide associated with at least one member of the group consisting of silica, alumina, zirconia, and thoria wherein at least part of the chromium is hexavalent is described in U.S. Patent 2,825,721 (1958) of Hogan et al. This process produces thermoplastic polymers which can be molded to form objects of any desired shape or configuration, extruded and cold-drawn to form filaments, or fabricated to form film. The molecular weight distribution of olefin polymers made with the modified and improved Hogan et al. catalyst of this invention is narrowed as compared with that of polymers produced by the unmodified Hogan et al. catalyst.

Accordingly, it is an object of the invention to provide an improved catalyst for promoting the polymerization of 1-olefins comprising ethylene. Another object is to provide an improved process for preparing ethylene polymers and copolymers with other 1-olefins having narrower molecular weight distribution with the improved catalyst. Other objects of the invention will become apparent to one skilled in the art upon consideration of the accompanying disclosure.

The narrowing of the molecular weight distribution of ethylene homopolymer and copolymers thereof with other 1-olefins is effected by performing the polymerization of the monomer(s) in the presence of or in contact with the olefin polymerization catalysts of U.S. Patent 2,825,721 having incorporated therein an amount in the range of 0.1 to 8 weight percent of ammonium fluoroborate, heavy metal fluoroborate, or heavy metal fluorosilicate or mixtures thereof.

Narrowing the molecular weight distribution of olefin polymers made with the catalyst and process of U.S. 2,825,721 by addition of ammonium fluorosilicate to the chromium oxide catalyst is described in U.S. 3,130,188. I have found that even narrower molecular weight distribution can be obtained by the use of the compounds enumerated above. By heavy metals I mean all the metals of the periodic system except the alkali and alkaline earth metals. However, I prefer to use the fluoroborate or fluorosilicate of the Group I-B metals, copper, silver, and gold (Periodic Chart as shown in Handbook of Chemistry and Physics, Chemical Rubber Company, 45th edition (1964), page B-2). The methods of preparation, concentration limits, reaction conditions, diluents, and the like of U.S. 3,130,188 are applicable.

Molecular weight distribution is indicated by the ratio of the weight-average molecular weight, $M_w$, to the number-average molecular weight, $M_n$. A high value for this ratio is indicative of a broad molecular weight distribution. Both weight-average and number-average molecular weight were determined by gel permeation chromatography (GPC), as described by J. C. Moore, J. Polymer Science, part A, vol. 2, pages 835–843 (1964). Calibration of the GPC method was by membrane osmometry ($M_n$) and light scattering ($M_w$). Molecular weight distribution is also reflected by the ratio of high-load melt index (HLMI) to regular melt index (MI) as determined by ASTM D 1238–62T (conditions F and E, respectively). A higher value for this ratio at a given melt index is indicative of a broader molecular weight distribution. This ratio is sometimes referred to as shear response.

In order to illustrate the invention, runs were made using the catalysts prepared from a microspheroidal silica base containing 0.1 weight percent alumina and having an average pore diameter of about 225 A., and were activated in dry air for 5 hours at 1150° F. after being impregnated with the selected catalyst constituents. Compositions and other details of catalyst preparation are presented in Table I below:

TABLE I

| Catalyst used in run number | Cr. wt. percent | Additive used | Wt. percent | Remarks |
|---|---|---|---|---|
| 1 | 0.98 | None | | Base impregnated with aqueous CrO₃ solution and dried at 300° F. |
| 2 | 0.90 | NH₄ fluorosilicate. | 1.0 | Base impregnated with aqueous CrO₃ solution, dried at 300° F., and dry-mixed with additive. |
| 3 | 0.98 | Cu fluorosilicate | 1.0 | Base impregnated with aqueous CrO₃ solution, dried at 300° F., and dry-mixed with the hexahydrate of the additive. |
| 4 | 0.98 | NH₄ fluoroborate | 1.0 | Base impregnated with aqueous CrO₃ solution, dried at 300° F., and dry-mixed with additive. |
| 5 | 0.98 | Cu fluoroborate | 1.5 | Base impregnated with aqueous CrO₃ solution, dried at 300° F., mixed with an aqueous solution containing 45 weight percent additive, and dried again at 300° F. |

The polymerization runs were made in a 1.3-liter stirred reactor using the following technique: The reactor was warmed and flushed with dry nitrogen, and 0.05 to 0.15 gram of the catalyst—suspended in about 340 grams of a hydrocarbon reaction medium containing about 85 weight percent cyclohexane and 15 percent substituted cyclopentanes and branched heptanes—was charged. The reactor was heated to the indicated reaction temperature and ethylene was added to maintain a pressure of 450 p.s.i.g. for 1 hour.

TABLE II

| Run No. | Temp., °F. | Polymer yield, lb./ lb. catalyst | Melt index HLMI | MI | HLMI/MI | Molecular weight $M_w$ | $M_n$ | $M_w/M_n$ |
|---|---|---|---|---|---|---|---|---|
| 1a | 285 | 1,135 | 364 | 11.30 | 32.2 | 95,000 | 18,000 | 5.38 |
| 1b | 300 | 888 | 654 | 25.70 | 26.0 | | | |
| 2a | 275 | 1,300 | 191 | 6.48 | 29.5 | | | |
| 2b | 285 | 1,450 | 305 | 11.10 | 27.6 | 85,000 | 16,000 | 5.20 |
| 2c | 300 | 1,595 | 571 | 21.50 | 26.6 | | | |
| 3a | 275 | 1,310 | 204 | 7.35 | 27.8 | | | |
| 3b | 285 | 1,360 | 351 | 13.65 | 25.7 | 84,000 | 20,000 | 4.11 |
| 3c | 300 | 1,645 | 700 | 28.90 | 24.2 | | | |
| 4a | 275 | 1,515 | 251 | 9.95 | 25.2 | | | |
| 4b | 285 | 1,580 | 364 | 14.50 | 25.1 | 68,000 | 20,000 | 3.44 |
| 4c | 300 | 1,500 | 700 | 29.00 | 24.1 | | | |
| 5a | 275 | 975 | 257 | 9.95 | 25.8 | | | |
| 5b | 285 | 964 | 394 | 15.90 | 24.8 | | | |
| 5c | 300 | 1,037 | 656 | 29.10 | 22.5 | | | |

Melt index ratios (HLMI/MI) were plotted versus melt index (MI) for these runs and the following melt index ratios read from the curves at a melt index of 20 are presented in Table III.

TABLE III

| Additive: | HLMI/MI at MI of 20 |
|---|---|
| None | 27.9 |
| NH$_4$ fluorosilicate | 26.4 |
| Cu fluorosilicate | 24.8 |
| NH$_4$ fluoroborate | 24.4 |
| Cu fluoroborate | 23.7 |

It is apparent that the catalysts as modified by this invention give comparable or higher polymer yields and narrower molecular weight distribution than the unmodified catalyst of U.S. 2,825,721 or the modified catalyst of U.S. 3,130,188.

Copolymers of ethylene with 1-olefins of 3 to 12 carbon atoms such as propylene, butenes, isobutylene, pentenes, hexenes, octenes, dodecenes, etc., as well as butadienes, are within the scope of the invention.

Certain modifications of the invention will become apparent to those skilled in the art and the illustrative details disclosed are not to be construed as imposing unnecessary limitations on the invention.

I claim:

1. A polymerization process which comprises polymerizing monomers selected from the group consisting of ethylene and mixtures of ethylene with up to 25 weight percent, based on total monomer, of at least one higher molecular weight 1-olefin having from 3–12 carbon atoms per molecule under polymerization conditions of temperature and pressure in the presence of a catalyst comprising chromium oxide supported on at least one member of the group consisting of silica, alumina, zirconia and thoria, wherein at least part of the chromium is hexavalent, said catalyst having incorporated therein an amount in the range of 0.1 to 8 weight percent of a catalyst member of the group ammonium fluoroborate, heavy metal fluoroborate, heavy metal fluorosilicate, and mixtures thereof, and recovering resulting polymer.

2. The process of claim 1 wherein said catalyst member comprises ammonium fluoroborate.

3. The process of claim 1 wherein said catalyst member comprises copper fluoroborate.

4. The process of claim 1 wherein said catalyst member comprises copper fluorosilicate.

5. The process of claim 1 wherein the selected monomer consists essentially of ethylene.

6. The process of claim 1 wherein ethylene and 1-butene are the selected monomers.

7. A catalyst for ethylene polymerization consisting essentially of chromium oxide supported on at least one member of the group silica, alumina, zirconia, and thoria, at least part of the chromium being hexavalent, and having incorporated therein an amount in the range of 0.1 to 8 weight percent of the catalyst at least one additional member selected from the group of ammonium fluoroborate, heavy metal fluoroborates, and heavy metal fluorosilicates.

8. The catalyst of claim 7 wherein said additional member comprises ammonium fluoroborate.

9. The catalyst of claim 7 wherein said additional member comprises copper fluoroborate.

10. The catalyst of claim 7 wherein said additional member comprises copper fluorosilicate.

References Cited
UNITED STATES PATENTS 2,825,721  3/1958  Hogan et al.
3,130,188  4/1964  Hogan.

JOSEPH L. SCHOFER, *Primary Examiner.*

M. B. KURTZMAN, *Assistant Examiner.*

U.S. Cl. X.R.

252—430, 433, 441; 260—88.2, 93.7